US011931667B2

(12) United States Patent
Castronuovo et al.

(10) Patent No.: US 11,931,667 B2
(45) Date of Patent: Mar. 19, 2024

(54) PERFORMER LIFT

(71) Applicant: BRILLIANT STAGES LIMITED, Pontefract (GB)

(72) Inventors: Giorgio Castronuovo, Pontefract (GB); James Kempf, Pontefract (GB); Gareth Mallon, Pontefract (GB)

(73) Assignee: Brilliant Stages Limited, West Yorkshire (GB)

( * ) Notice: Subject to any disclaimer, the term of this patent is extended or adjusted under 35 U.S.C. 154(b) by 770 days.

(21) Appl. No.: 17/050,974

(22) PCT Filed: Apr. 25, 2019

(86) PCT No.: PCT/GB2019/051158
§ 371 (c)(1),
(2) Date: Oct. 27, 2020

(87) PCT Pub. No.: WO2019/207310
PCT Pub. Date: Oct. 31, 2019

(65) Prior Publication Data
US 2021/0299588 A1 Sep. 30, 2021

(30) Foreign Application Priority Data
Apr. 27, 2018 (GB) ..................................... 1806903

(51) Int. Cl.
*A63J 5/12* (2006.01)
*B66B 9/16* (2006.01)

(52) U.S. Cl.
CPC .. *A63J 5/12* (2013.01); *B66B 9/16* (2013.01)

(58) Field of Classification Search
CPC ...... A63G 1/44; A63G 1/46; A63J 1/00; A63J 1/02; A63J 5/00; A63J 5/02; A63J 5/12
USPC .................................................. 472/2, 75–80
See application file for complete search history.

(56) References Cited

U.S. PATENT DOCUMENTS

| | | | | |
|---|---|---|---|---|
| 2004/0131452 A1 | 7/2004 | Walker et al. | | |
| 2012/0277010 A1* | 11/2012 | Bilsen | B60P 3/0252 | 472/75 |
| 2016/0193538 A1* | 7/2016 | Cantu | B66F 11/04 | 182/63.1 |

FOREIGN PATENT DOCUMENTS

| | | | |
|---|---|---|---|
| AU | 625660 | B2 | 7/1992 |
| CN | 201235232 | Y | 5/2009 |
| EP | 1538280 | A1 | 6/2005 |
| EP | 3293138 | A1 | 3/2018 |

(Continued)

OTHER PUBLICATIONS

International Search Report and Written Opinion for Application No. PCT/GB2019/051158 dated Jul. 19, 2019 (13 pages).

(Continued)

*Primary Examiner* — Kien T Nguyen
(74) *Attorney, Agent, or Firm* — Saxton & Stump, LLC

(57) ABSTRACT

A performer lift has abase portion (10) and an extension portion (12). The base portion (10) comprises a platform (16) and a lifting mechanism (18). The extension portion (12) is attachable to the base portion (10) to extend the height of the performer lift. The extension portion (12) allows a performer lift to be provided having a desired height. The performer lift can therefore be adapted to be used in different stage sets, by reusing the same base portion (10) and attaching different extension portions (12), having different heights.

14 Claims, 7 Drawing Sheets

(56) References Cited

FOREIGN PATENT DOCUMENTS

| | | |
|---|---|---|
| JP | 2008093014 A | 4/2008 |

OTHER PUBLICATIONS

United Kingdom Search Report for Application No. GB1806903.9 dated Aug. 31, 2018 (4 pages).

* cited by examiner

PERFORMER LIFT

The present invention relates to a performer lift for use in a stage assembly.

As well as complex lighting design and sound design, the modern music and theatre industry employs highly complex staging and set design in order to deliver engaging and entertaining shows. The staging may involve complex moving parts, for example in order to convey performers around a stage area during the course of the performance.

Performer lifts allow a performer to be lifted up from below the stage, or to be carried down beneath the stage. A typical performer lift comprises a frame surrounding a platform. The performer enters the frame and steps on the platform, and the platform is lifted by a lifting mechanism.

Performer lifts are typically manufactured to a standard size. If the height of the performer lift is too short to be used in a stage show, the performer lift may be placed on a box or the like, to raise the height of the performer lift, so that the performer may be raised to the stage level from beneath. This can be unsafe.

Other disadvantages associated with conventional performer lifts include that the lifting/lowering speed is slow, and the lifts can be unsafe.

According to the present invention there is provided an apparatus and method as set forth in the appended claims. Other features of the invention will be apparent from the dependent claims, and the description which follows.

According to a first aspect of the invention, there is provided a performer lift comprising a base portion and an extension portion, the base portion comprising a platform and a lifting mechanism and the extension portion being attachable to the base portion to extend the height of the performer lift.

The feature of the extension portion provides the advantage that a performer lift may be provided having a desired height. The performer lift can therefore be adapted to be used in different stage sets, by reusing the same base portion and attaching different extension portions, having different heights. The feature of lifting mechanism being provided in the base portion provides the advantage that when the performer lift is reused with different extension portions, the lifting mechanism and the platform need not be replaced.

The base portion may comprise a frame. The frame may define an enclosure in which a performer may stand. The extension portion may comprise a frame extension that may be removably attachable to the base portion to extend the height of the enclosure. The frame extension may be removably attached to the frame of the base portion using mechanical fastenings.

The base portion may comprise a door, which may be pivotally attached to the frame of the base portion, preferably by a hinge. The extension portion may comprise a door extension. The door extension may be attachable to the door, to extend the height of the door.

The lifting mechanism may be adapted to lift the platform from a bottom end of the base portion to a top end of the extension portion, and to lower the platform from the top end of the extension portion to the bottom end of the base portion. When the platform is raised to the top end of the extension portion, an upper surface of the platform may be substantially flush with a top surface of the extension portion.

The lifting mechanism may be a toaster lift. The lifting mechanism may comprise a motor assembly and a chain system connected to the platform, wherein the chain system is driven by the motor assembly. The chain system may be a greaseless chain system, preferably comprising a pair of chains. The motor assembly may comprise an electric motor, preferably an AC servo motor, for operating the chain system. The motor may drive a reduction gearhead, which in turn may drive an axle. The axle may comprise chain gear portions arranged to engage the chain system. The axle may comprise a pair of chain gear portions, wherein each of the chain gear portions is arranged to engage a respective one of the pair of chains.

The lifting mechanism may comprise means for controlling a height to which the platform is lifted. The means for controlling the height may comprise a rotary limit switch.

The performer lift may comprise a safety locking mechanism. The safety locking mechanism may be operable to detect whether the door is closed, and may control the lifting mechanism based on whether the door is open or closed. The safety locking mechanism may prevent the lifting mechanism from operating if the door is open. The safety locking mechanism may be provided in the base portion and may comprise a lever limit switch. The door may comprise a handle that may engage the lever limit switch when the door is closed. The lever limit switch may communicate with the motor to control operation of the motor according to whether it is sensed that the door is closed. The safety locking mechanism provides the advantage that the lifting mechanism is prevented from operating before the performer is fully inside the performer lift enclosure and the door is closed, thereby avoiding any accidents that may otherwise occur if the platform is raised while the performer is entering the lift.

The performer lift may comprise interior walls. The interior walls may be provided on the base portion and the extension portion, preferably attached to the frame and the frame extension. The interior walls may be formed of sheeting of a plastics material, preferably polycarbonate. An interior surface of the door and the door extension may also be provided with sheeting. One of the interior walls may cover the lifting mechanism, and may comprise openings for allowing the lifting mechanism to raise the platform. The interior walls improve safety of the performer lift because the risk that a performer may trap a body part or some clothing in the lifting mechanism or between the frame and the platform while the platform is being raised is avoided.

The platform may comprise a platform frame, preferably formed of aluminium. The platform may comprise a surface on which a user may stand. The surface may comprise plywood. The surface may be a laminate surface, preferably phenolic laminate.

The platform may be adapted to fit within the interior walls of the base portion and extension portion, and a space between edges of the platform and the interior walls may be less than 10 mm, preferably 6 mm. This reduces the risk that a performer may trap a body part or clothing between the interior walls and the platform when the platform is raised.

The performer lift may comprise means for adjusting the position of the performer lift. The means for adjusting the position of the performer lift may be castors. The castors may be attached to the base portion.

The performer lift may be portable. The performer lift may be attachable to a dolly having castors. The base portion may be removably attachable to the dolly. The performer lift may be lifted onto the dolly so that the performer lift can be easily moved to another location.

The base portion may comprise fork channels, for allowing a fork lift to lift the performer lift on or off the dolly and/or to move the performer lift around a site.

The performer lift may comprise adjustable feet for levelling the performer lift. The levelling feet may be provided on the base portion. The levelling feet may be integral with the base portion.

The performer lift may comprise interfacing means, preferably lugs, for interfacing with a stage assembly. The performer lift may comprise a plurality of interfacing means. One or more of the interfacing means may be provided on the base portion, preferably integral with the base portion. One or more of the interfacing means may be provided on the extension portion, preferably integral with the extension portion.

According to a second aspect of the invention there is provided an extension portion for a performer lift, wherein the extension portion is adapted to be attached to a top of a performer lift, to extend the height of the performer lift.

The extension portion may comprise any of the features of the extension portion of the first aspect of the invention.

According to a third aspect of the invention there is provided a base portion for a performer lift, wherein the base portion comprises a platform and a lifting mechanism, and wherein the base portion is configured to support an extension portion.

The base portion may comprise any of the features of the base portion of the first aspect of the invention.

According to a fourth aspect of the invention there is provided a kit of parts for a performer lift, comprising a base portion and at least one extension portion, wherein the base portion comprises a platform and a lifting mechanism and the extension portion being attachable to the base portion to extend the height of the performer lift.

The kit of parts may comprise a plurality of extension portions. The extension portions may be of different heights. One extension portion may be selected from the plurality of extension portions to be attached to the base portion, wherein the selected extension portion is selected to achieve a desired height of performer lift.

The at least one extension portion may comprise any of the features of the extension portion of the first aspect of the invention. The at least one base portion may comprise any of the features of the base portion of the first aspect of the invention.

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which.

Figure 1:
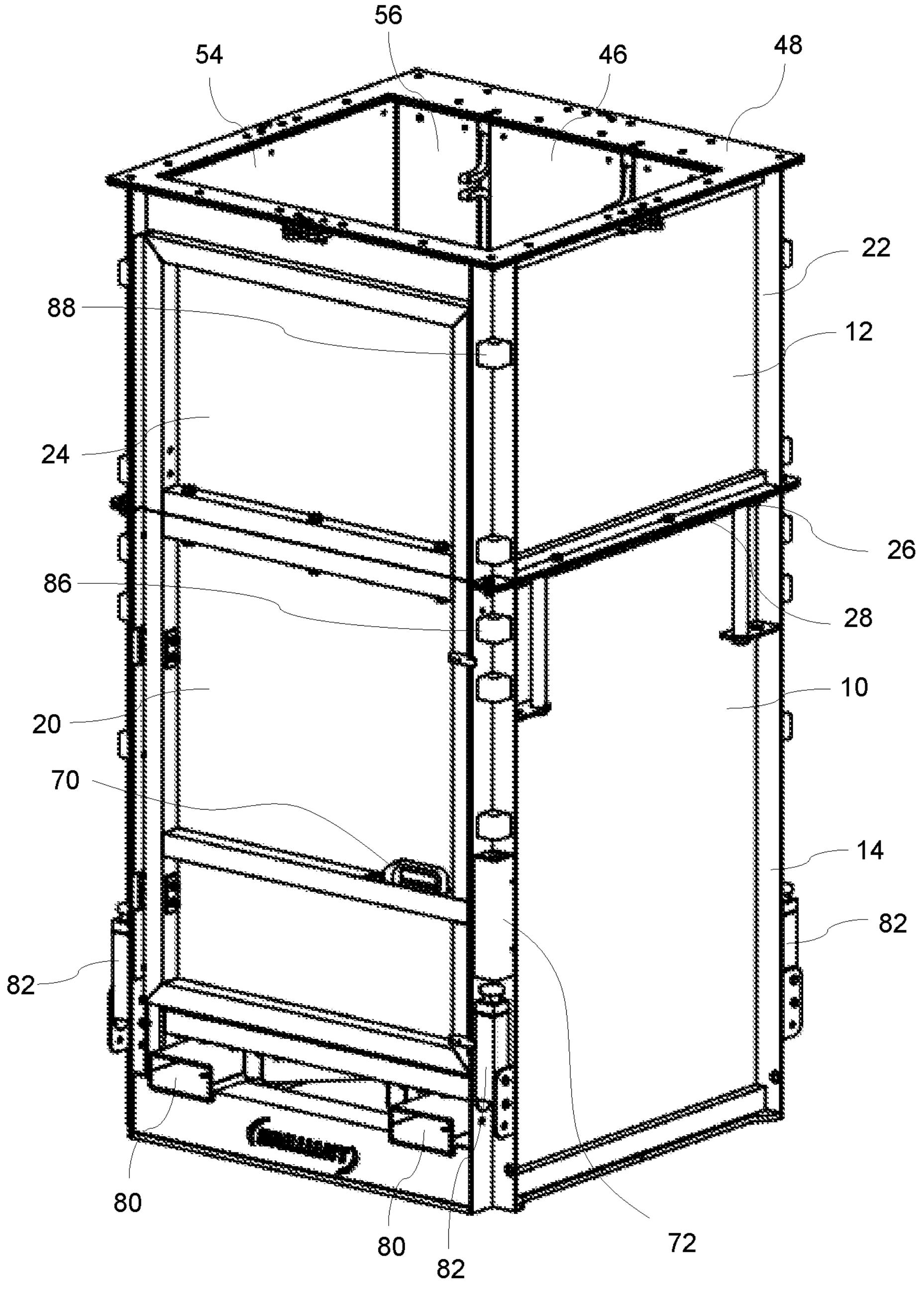
FIG. 1 shows a front perspective view of a performer lift.

As shown in FIGS. 1-7, a performer lift comprises a base portion 10 and an extension portion 12. The base portion 10 comprises a frame 14, a platform 16, a lifting mechanism 18 (shown in FIGS. 6 and 7), and a door 20. The extension portion 12 comprises a frame extension 22 and a door extension 24. The door 20 and lifting mechanism 18 are provided on relative front and rear sides of the performer lift respectively. The extension portion 12 is removably attached to the base portion 10. The base portion 10 is adapted to support and be attached to other extension portions, having different heights, such that the height of the performer lift can be altered.

Figure 4:
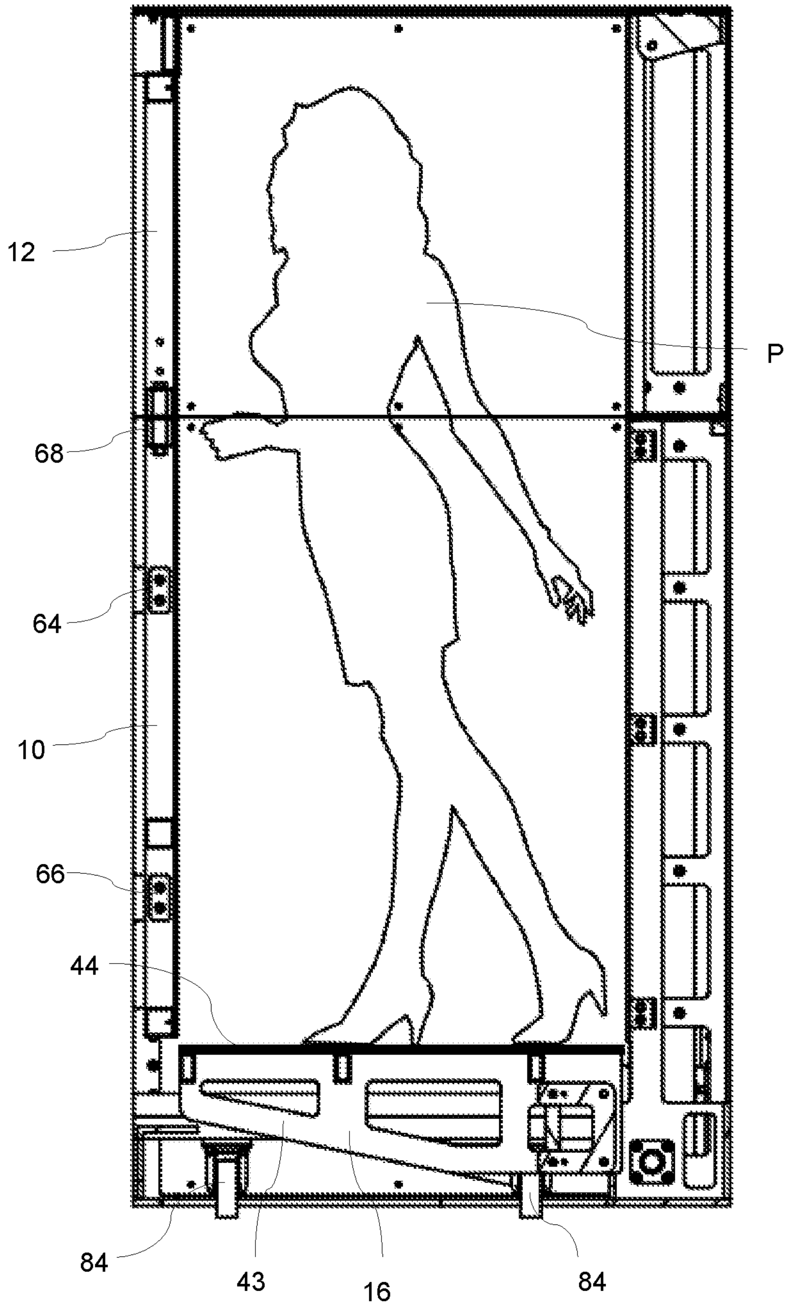
FIG. 4 shows a section view of the performer lift along the line A-A shown in FIG. 3.

The frame 14 forms a substantially cuboidal enclosure in which a performer P stands when the lift is used, as shown in FIG. 4. The extension portion 12 is operable to extend the height of this cuboidal enclosure by attachment of the frame extension 22 to an upper part 26 of the frame 14. The frame extension 22 is attachable to the frame 14 using mechanical fastenings 28. The frame 14 and frame extension 22 are formed of metal, preferably aluminium.

Figure 7:
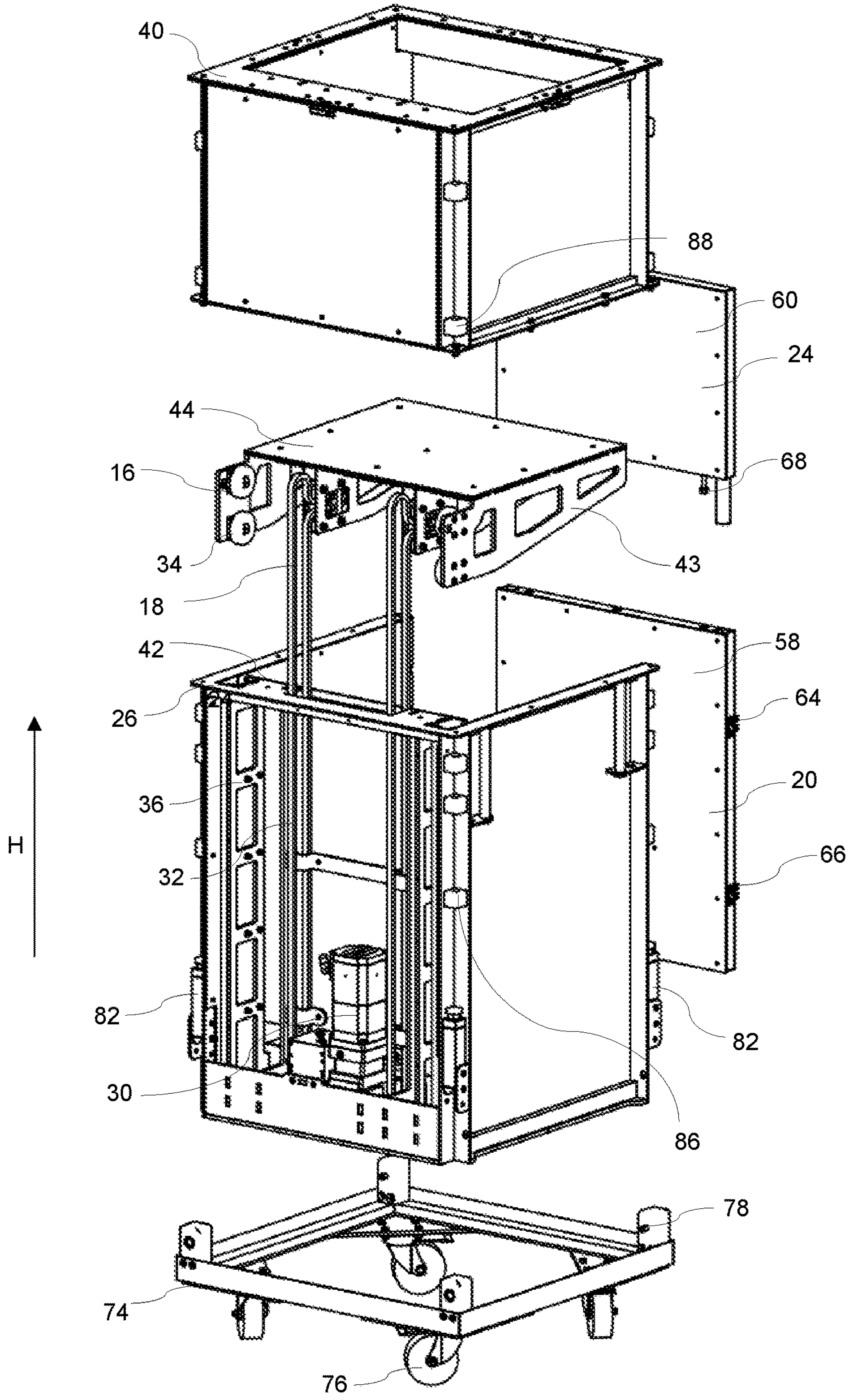
FIG. 7 shows a rear exploded view of the performer lift.

The platform 16 and the lifting mechanism 18 are provided in the base portion 10. The lifting mechanism 18 and platform 16 form a toaster lift. As shown in FIG. 7, the lifting mechanism 18 comprises an electric motor 30, preferably an AC servo motor, and a chain system 32 to be driven by the electric motor 30 via a gear system (not shown). The motor 30 is operable to drive a reduction gearhead, which in turn drives an axle. The axle comprises a pair of chain gear portions, wherein each of the chain gear portions is arranged to engage a respective one of the pair of chains 32. The lifting mechanism 18 also comprises a controller for controlling the motor 30. The controller is configured to control the distance by which the platform 16 can be raised and lowered. The chain system 32 is connected to the platform 16 by forks, such that the platform is lifted or lowered on operation of the motor 30. The rotational motion provided by the motor 30 causes the chains 32 to move linearly, thereby raising or lowering the platform 16. The platform comprises silent bearings 34 that are guided along guide rails 36 in the base portion 10 and the extension portion 12 as the platform 16 is raised and lowered by the lifting mechanism 18.

The lifting mechanism 18 is capable of lifting the platform 16 from the bottom 38 of the base portion 10 to the top 40 of the extension portion 12 in 2-3 seconds. The height by which the platform 16 can be lifted is adjustable by adjusting the length of the chains 32. The lifting mechanism 18 controls the height to which the platform 16 is lifted by means of a limit switch enclosure that forms part of the lifting mechanism 18. The limit switch enclosure includes a rotary limit switch and a secondary encoder. The secondary encoder is configured to sense the extent that the platform 16 has been lifted or lowered based on rotation of the axle driven by the motor 30 and to feed back to the motor 30. The rotary limit switch stops the motor 30 when the platform 16 is fully raised or lowered.

The top of the rear side of the frame comprises openings 42 for the chains 32 to extend beyond the top of the base portion 10 into the extension portion 12. This allows the platform 16 to be raised by the lifting mechanism 18 to the top 40 of the extension portion 12.

Figure 6:
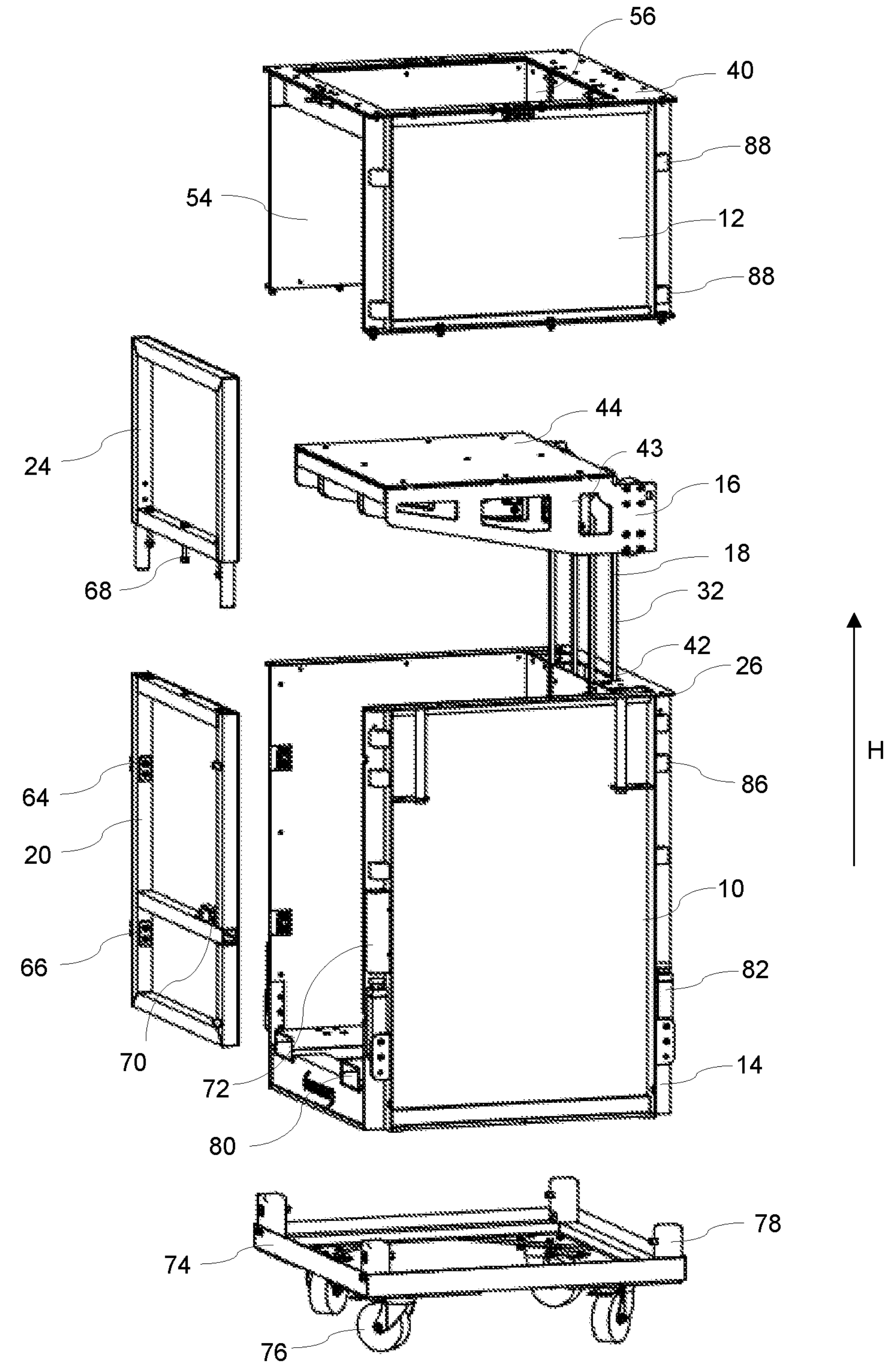
FIG. 6 shows a side exploded view of the performer lift.

The platform 16 comprises a frame 43 and a flat surface 44 upon which the performer may stand to be lifted and lowered. The flat surface 44 may be formed of plywood, or may be a composite material, such as phenolic laminate. The platform 16 is adapted to be raised by the lifting mechanism 18 in the height direction H of the performer lift, as shown in FIGS. 6 and 7.

In the lowered position, the platform 16 is provided at the bottom 38 of the base portion 10, such that a performer can step through the open doorway and onto the platform 16. The top of the performer lift is open, so that as the platform 16 is raised, the performer is lifted through the opening 46 at the top of the lift. When the platform 16 is in the fully raised position, the flat surface 44 of the platform is level with the top surface 48 of the extension portion 12. The performer lift may be arranged in a stage assembly such that the top surface 48 of the extension portion 12 is substantially level with a staging surface and the performer may step from the platform 16 onto the stage surface.

Figure 2:
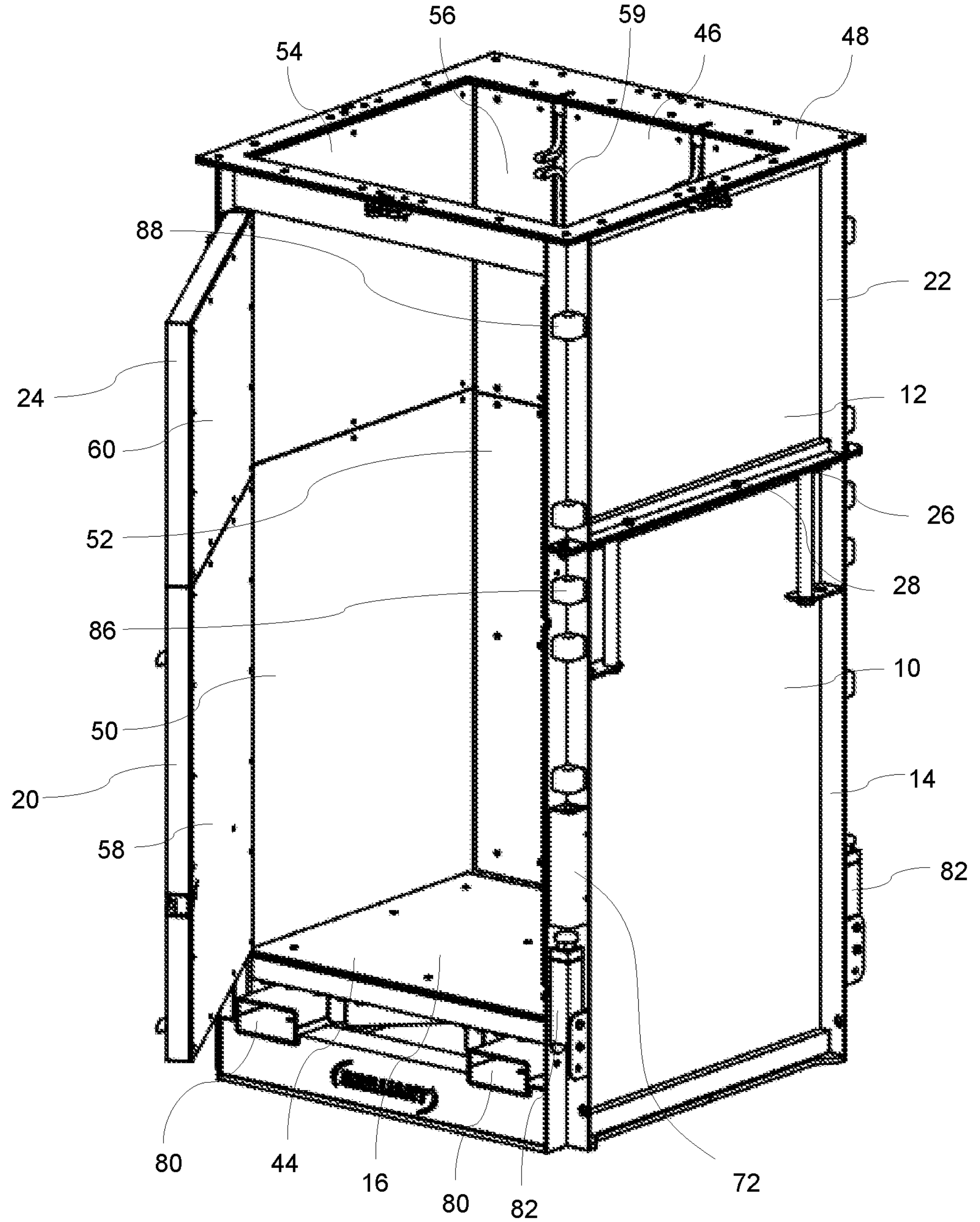
FIG. 2 shows a front perspective view of the performer lift with the door open.
Figure 3:
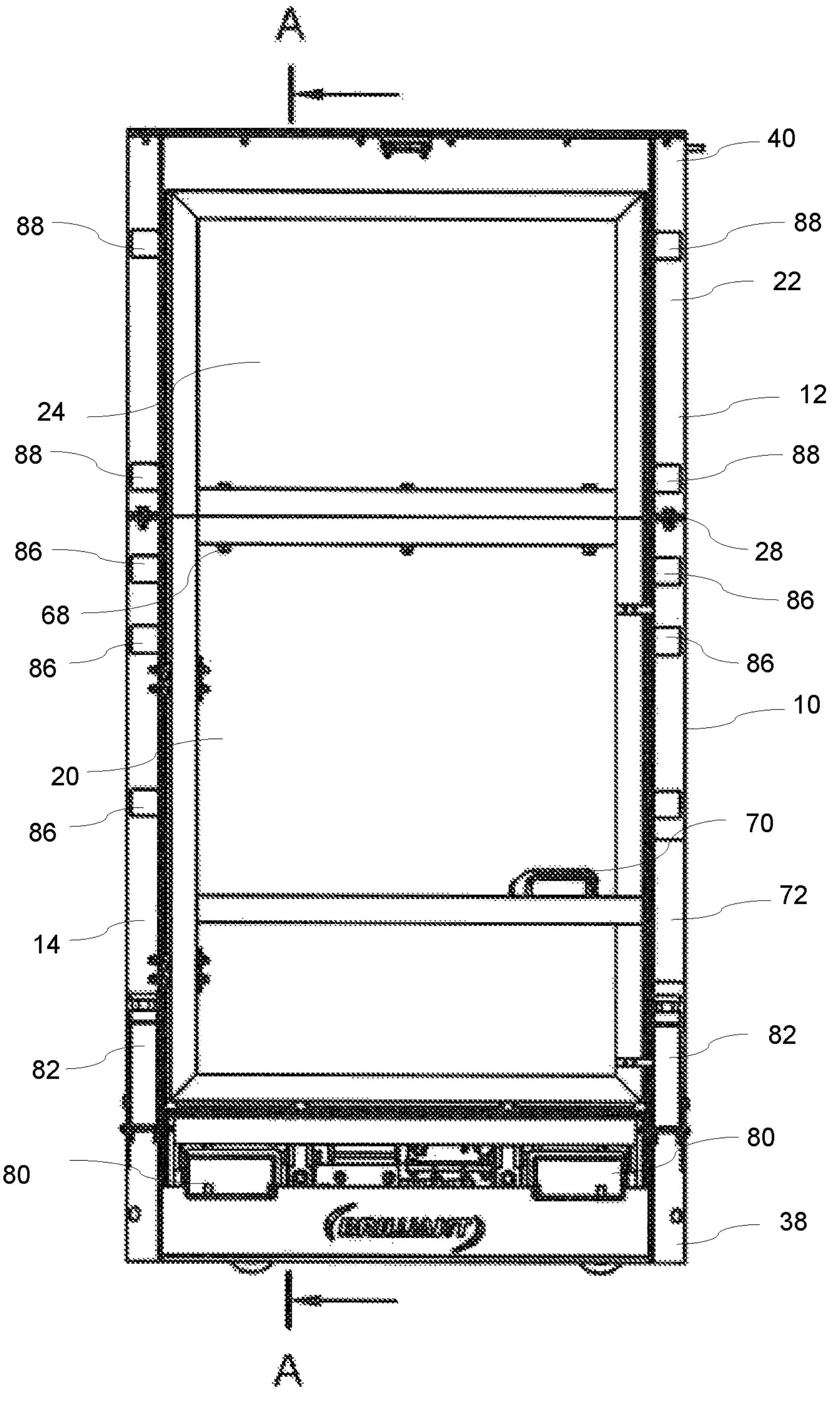
FIG. 3 shows a front plan view of the performer lift.

The performer lift comprises interior walls 50, 52, 54, 56 formed of polycarbonate sheeting and attached to the main frame 14 and the frame extension 22. The interior of the door 20 and the door extension 24 is also covered by polycarbonate sheeting 58, 60, as shown in FIG. 2. The sheeting covers the interior of the frame 14 and the frame extension 22, such that the enclosure in which the performer stands is surrounded by the interior walls 50, 52, 54, 56. As shown in FIG. 2, the interior walls 52, 56 that cover the lifting mechanism comprise gaps 59 for allowing the forks of the lifting mechanism 18 to extend through the walls 52, 56 to be connected to the platform 16.

Figure 5:
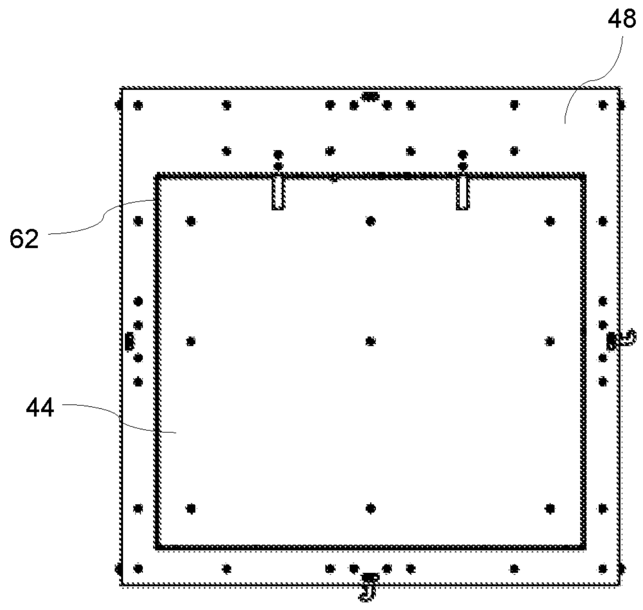
FIG. 5 shows a top plan view of the performer lift.

As shown in FIG. 5, the spaces 62 between the edge of the platform surface 44 and the interior walls 50, 52, 54, 56 of the performer lift are minimised. The distance between the edge of the platform surface 44 and the interior walls 50, 52, 54, 56 is approximately 6 mm. This reduces the risk that a performer may trap a body part or clothing between the interior walls 50, 52, 54, 56 and the platform 16 when the platform 16 is raised.

The door 20 is pivotally attached to the frame 14 by hinges 64, 66, and the door extension 24 is adapted to be attached to the top of the door 20 by mechanical fixings 68. The door comprises an exterior handle 70. When the door extension 24 is attached to the door 20, opening of the door 20 using the handle 70 will open the door extension 24 together with the door 20.

The base portion 10 comprises a safety locking mechanism 72 that is operable to sense whether the door 20 is closed and to control the lifting mechanism 18 based on whether the door 20 is open or closed. The safety locking mechanism 72 prevents the lifting mechanism 18 from operating if the door 20 is open. The safety locking mechanism 72 comprises a redundant snap action lever limit switch in an enclosed aluminium assembly. The lever limit switch is engageable by the handle 70 and communicates with the drive, which ultimately communicates with the motor 30 to prevent the motor from operating when the lever switch is not engaged by the handle.

The performer lift can be provided on a dolly 74, as shown in FIGS. 6 and 7. The dolly 74 comprising castors 76 and attachment means 78 for attaching the dolly 74 to the base portion 10. The attachment means 78 are provided at the corners of the dolly 74. The dolly 74 allows the performer lift to be easily transported. The base portion 10 comprises fork lift channels 80, shown in FIGS. 1-3 and 6. The fork lift channels 80 allow a fork lift to engage the performer lift to lift the performer lift onto and off the dolly, and to handle the performer lift around a site.

The base portion 10 comprises levelling feet 82 that are adjustable. The levelling feet 82 can be used to adjust the position of the base portion 10 so that the top of the extension portion 12 can lie level with a stage surface in use. The levelling feet 82 are provided at the four corners of the base portion, and can be rotated by 180 degrees, such that they can be flipped out of the way when the performer lift is attached to the dolly 74 by the attachment means 78. FIGS. 1-3, 6 and 7 show the levelling feet in the position in which they have been flipped 180 degrees into the position that allows the attachment of the performer lift to the dolly 74.

The base portion 10 comprises castors 84, as shown in FIG. 4. The castors 84 allow local handling of the performer lift and positioning of the performer lift at the desired location when assembling the stage assembly.

The base portion 10 comprises lugs for interfacing and locating the performer lift within a staging assembly, wherein the lugs are blocks 86. Similarly, the extension portion 12 comprises lugs for interfacing and locating the performing lift within a staging assembly, wherein the lugs are blocks 88.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A performer lift comprising a base portion and an extension portion, the base portion comprising a platform and a lifting mechanism and the extension portion being attachable to the base portion to extend the height of the performer lift;

wherein the base portion and the extension portion comprise interior walls, attached to a frame and a frame extension respectively;

wherein the lifting mechanism comprises a connecting portion for connecting the lifting mechanism to the platform, and wherein one of the interior walls covers the lifting mechanism and comprises openings through which the connecting portion projects to allow the lifting mechanism to lift the platform.

2. The performer lift according to claim 1, wherein the base portion comprises the frame and the extension portion comprises the frame extension, wherein the frame defines an enclosure in which a performer may stand and the frame extension is removably attachable to the frame to extend the height of the enclosure.

3. The performer lift according to claim 1, wherein the interior walls are formed of polycarbonate sheeting.

4. The performer lift according to claim 1, wherein the base portion comprises a door, and the extension portion comprises a door extension, wherein the door extension is attachable to the door, to extend the height of the door.

5. The performer lift according to claim 4, wherein the base portion comprises a safety locking mechanism, wherein the safety locking mechanism is operable to detect whether the door is closed, and to control the lifting mechanism based on whether the door is open or closed.

6. The performer lift according to claim 5, wherein the safety locking mechanism is configured to prevent the lifting mechanism from operating when it is detected that the door is open.

7. The performer lift according to any claim 1, further comprising a dolly having castors, wherein the base portion is attachable to the dolly.

8. The performer lift according to claim 1, wherein the base portion comprises levelling feet for adjusting the position of the base portion.

9. The performer lift according to claim 1, wherein the base portion comprises fork channels for allowing a fork lift to engage the performer lift to lift the performer lift onto and off a dolly and/or to handle the performer lift around a site.

10. The performer lift according to claim 1, wherein the base portion comprises castors for adjusting a position of the performer lift around a site and/or in a staging system.

11. An extension portion for a performer lift according to claim 1, wherein the extension portion is adapted to be attached to a top of a performer lift, to extend the height of the performer lift.

12. A base portion for a performer lift according to claim 1, wherein the base portion comprises a platform and a lifting mechanism, and wherein the base portion is configured to support an extension portion and to be attached to the extension portion.

13. A kit of parts for a performer lift according to claim 1, comprising a base portion and at least one extension portion, wherein the base portion comprises a platform and a lifting mechanism and the extension portion is attachable to the base portion to extend the height of the performer lift.

14. The kit of parts according to claim 13, comprising a plurality of extension portions, wherein the plurality of extension portions are adapted to extend the height of the performer lift by differing amounts.

* * * * *